July 29, 1958 C. B. RICHEY ET AL 2,844,933
CORN PICKER
Filed April 23, 1956 2 Sheets-Sheet 1
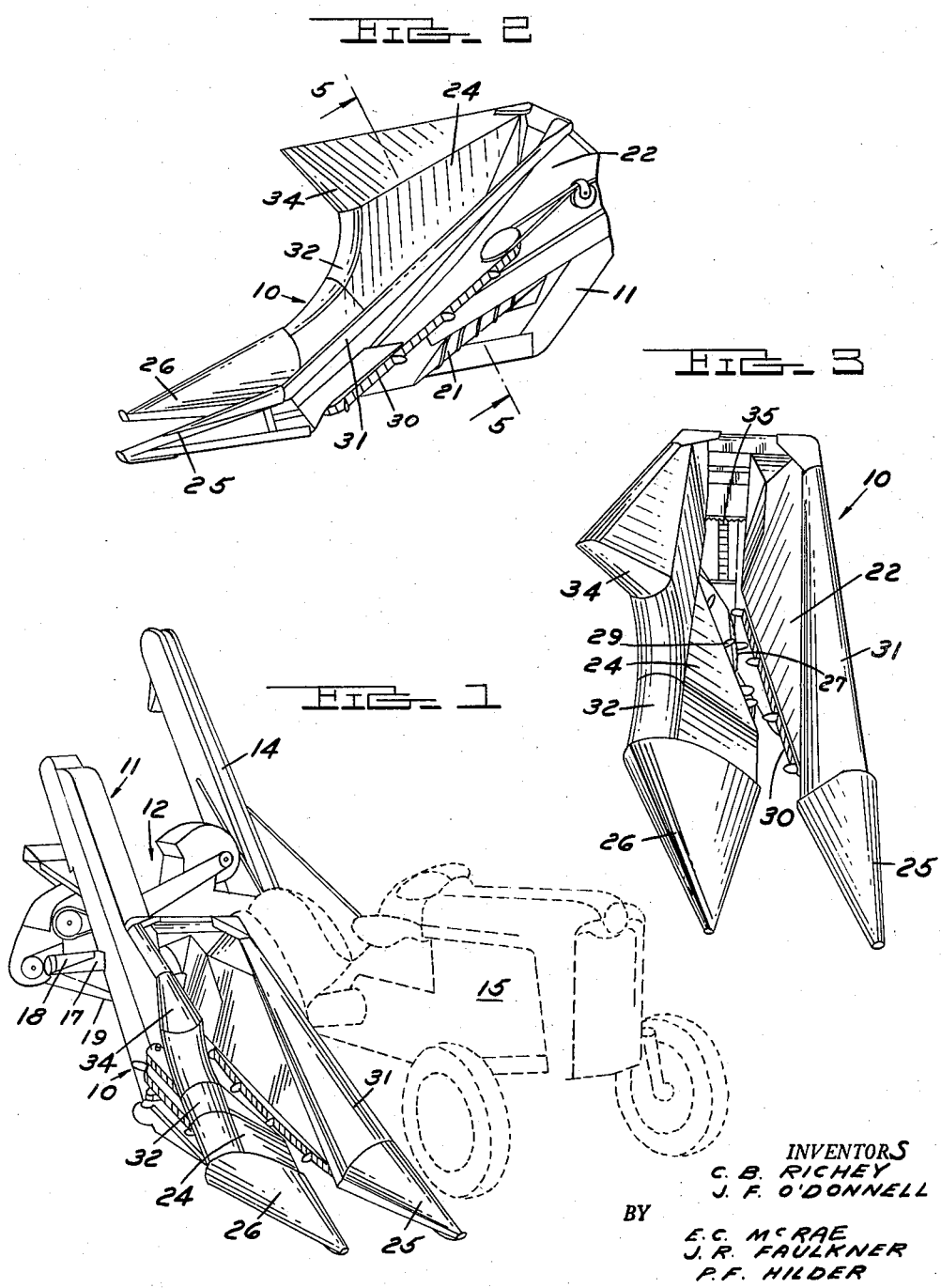
INVENTORS
C. B. RICHEY
J. F. O'DONNELL
BY
E. C. McRAE
J. R. FAULKNER
P. F. HILDER
ATTORNEYS July 29, 1958
C. B. RICHEY ET AL
2,844,933
CORN PICKER
Filed April 23, 1956
2 Sheets-Sheet 2
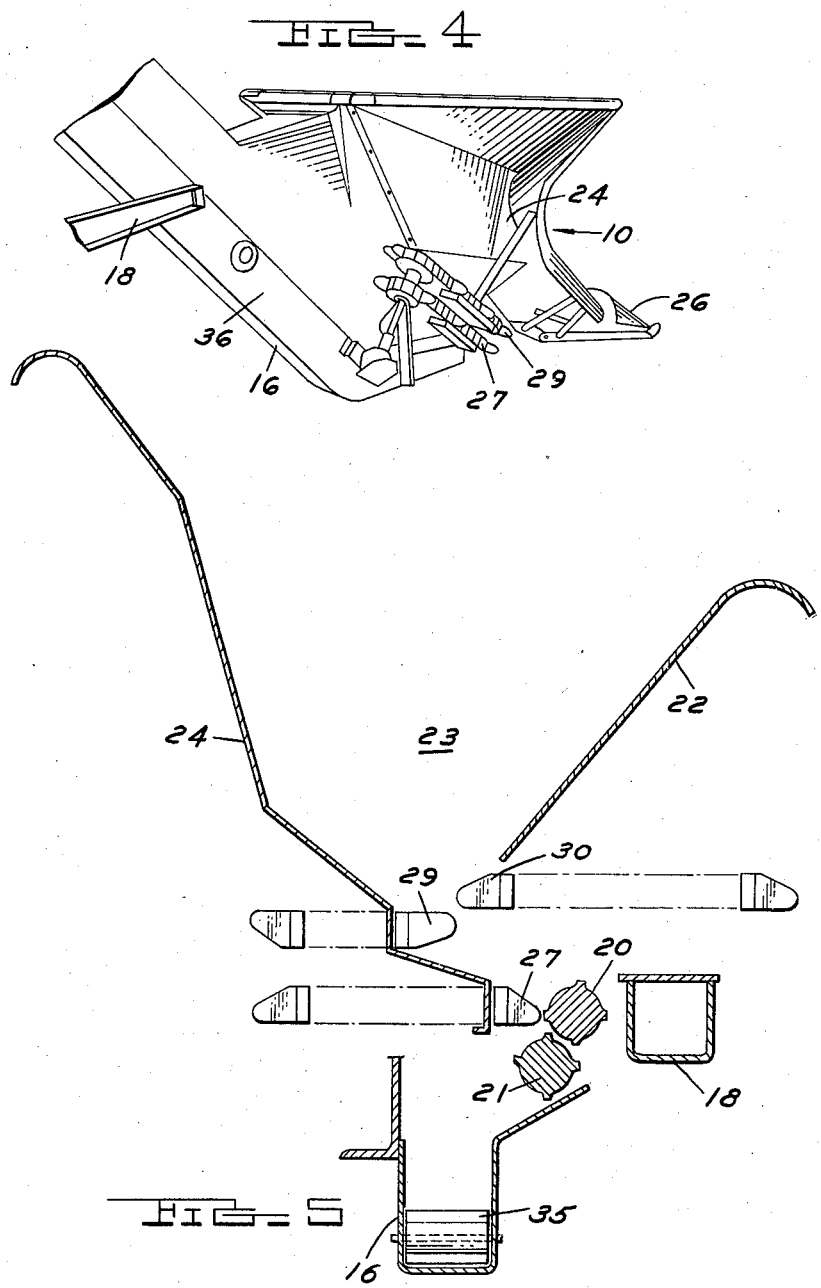
INVENTORS
C. B. RICHEY
J. F. O'DONNELL
E. C. McRAE
J. R. FAULKNER
P. F. HILDER
BY
ATTORNEYS United States Patent Office 2,844,933
Patented July 29, 1958

2,844,933

CORN PICKER

Clarence B. Richey, Royal Oak, and John F. O'Donnell, Rochester, Mich., assignors to Ford Motor Company, Dearborn, Mich., a corporation of Delaware Application April 23, 1956, Serial No. 579,816

3 Claims. (Cl. 56—104)

This invention relates to mechanical corn pickers and, more particularly to improvements in the corn snapping units therefor. The term "corn pickers" as used herein includes machines both with and without husking units, for picking corn from the stalk.

The corn picker of the present invention is of the type adapted to be passed along a row of corn, the stalks remaining attached to the ground but being passed between a pair of counterrotating snapping rolls which remove the ears from the stalks, the ears being conveyed up an elevator to a husking bed (if any) and the stalks being passed downwardly between the rolls and remaining standing after the picker has passed. The machine of the present invention utilizes a pair of snapping rolls which are mounted one above the other so that when the ears are snapped from the stalks they immediately will fall upon the elevator and be carried upwardly rather than remain on the snapping rolls with attendant shelling of corn from the ears, particularly if an ear has been husked in its removal from the stalk by the snapping rolls, as frequently occurs. A corn picker of this type is disclosed in U. S. Patent 2,681,541. In corn pickers of this type, the stalk is bent laterally (generally at right angles to the path of the picker), the stalk extending generally tangentially from the snapping rolls.

The flare sheets ordinarily provided for shielding and covering the mechanism and providing a smooth rounded surface for guiding the stalks into the snapping rolls, supporting them during the snapping operation, and guiding the ears onto the elevator are usually provided with rounded leading or forward surfaces or edges which slope upwardly from the gathering points, the forward edges of the flare sheets providing generally straight, smooth, rounded surfaces for raising down corn (stalks that have become bent or broken and are lying generally parallel to the ground).

In the picker according to the present invention, the flare sheet on the side opposite the snapping rolls has been provided with a rounded, concave, vertically overhanging leading edge which not only serves to guide standing corn into the snapping rolls but also raises and guides down corn into the rolls, and at the same time intercepts and collects ears of tall corn that might otherwise be lost over the top of the flare sheet as the stalk is bent laterally by the snapping rolls, particularly if the corn is more or less dry and there is a tendency of the ears to break from the stalk before reaching the snapping rolls.

Among the objects of the present invention are to provide a corn picker having an improved flare sheet contour so as to reduce picking losses to a minimum; to provide such a construction in a corn picker having the snapping rolls one above the other; and to generally improve corn pickers of the type described.

Other objects and the nature and scope of the invention will be more apparent from the detailed description to follow:

Our invention is clearly defined in the appended claims.

In the claims, as well as in the description, parts may at time be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

Figure 1 is a perspective view of a side mounted, single row corn picker embodying the present invention, the picker being shown mounted on a tractor indicated in broken lines.

Figure 2 is a perspective view of the snapping unit of the corn picker, taken from the tractor side.

Figure 3 is a front oblique view of the picker.

Figure 4 is a perspective view of the rear and outer side of the snapping unit.

Figure 5 is a more or less diagrammatic enlarged cross section of the snapping unit, taken generally along a plane perpendicular to the axes of the snapping rolls and indicated as line 5—5 of Figure 2.

Referring to Figure 1, the corn picker of the present invention includes a snapping unit 10, including a snapped corn elevator 11, a husking unit 12 and an elevator 14, all mounted on a tractor 15 which is indicated in broken lines. The snapping unit 10 removes the ears from the corn stalks, at least partially husking some of the ears in the process, the ears being carried by the snapped corn elevator 11 to the husking unit which husks all ears not already husked and delivers the ears to the elevator 14 which drops them into a wagon (not shown) towed behind the tractor 15. The present invention is concerned with the snapping unit 10. The other components of the corn picker shown are in many respects entirely conventional and will not be described in detail.

The component parts of the snapping unit 10 are supported by a framework, including a rearwardly, upwardly inclined frame member or channel 16 of generally rectangular cross section forming the lower portion of an enclosure and the frame for the snapped corn elevator 11. The channel 16 is extended forwardly below a pair of snapping rolls 20 and 21 (Figure 5), and the lesser frame members and operating elements of the snapping unit are mounted thereon. The channel 16 is pivotally supported on the forward end of a radial arm 18 secured to a transverse member 17 and is oscillated on the arm 18 through a vertical arc by a link 19 operated by hydraulically positioned draft links to raise or lower the snapping unit 10.

The snapping rolls 20 and 21 are rotatably mounted, these rolls being slightly spaced and the roll 20 being positioned above the roll 21 as indicated in Figure 5. The snapping rolls 20 and 21 are rearwardly, upwardly inclined (Figure 2) and are positioned to one side of the frame member 16, being carried by a lesser frame member 18. Preferably, the snapping rolls 20 and 21 are skewed somewhat, the lower ends of the rolls being more nearly at a common elevation (laterally spaced), while at the upper portions of the rolls, at which snapping ears from the stalks takes place, the upper snapping roll 20 is more nearly vertically spaced from and overlies the lower roll 21 as indicated in Figure 5. The rolls are counterrotated by a drive mechanism (not shown) from the power take-off of the tractor, and the lower, forward portions of the rolls are provided with a smooth spiral rib to aid in feeding corn stalks rearwardly. This arrangement of the snapping rolls is disclosed more completely in Richey and O'Donnell U. S. Patent 2,681,541.

The snapping unit 10 is provided with an inner flare sheet 22 and an outer flare sheet 24, the inner flare sheet being positioned generally above the snapping rolls 20 and 21, and the outer flare sheet being spaced somewhat from the inner flare sheet and together therewith forming a trough or slot 23 having upwardly diverging walls. The contour of the flare sheets will be described in more detail hereinafter.

A pair of gathering points 25 and 26 extend forwardly from the forward ends of the flare sheets, the gathering points each having a rounded upper surface consisting generally of a portion of a cone, which merges with the surface contour of the flare sheets 22 and 24 respectively. The gathering points 25 and 26 and the flare sheets 22 and 24 together form a forwardly opening slot for guiding corn stalks into the space between the counter-rotating snapping rolls 20 and 21, this slot being a forward continuation of the trough or slot 23 leading upwardly from the zone of the snapping rolls. The gathering points 25 and 26 not only guide standing corn into the space between the flare sheets 22 and 24, but also serve to raise down corn sufficiently so that the stalk will be entered between the flare sheets.

The snapping unit 10 of the present invention utilizes three gathering chains 27, 29 and 30. These gathering chains are endless chains supported and driven by sprockets, the chains having projections at intervals therealong for engaging corn stalks and conducting them rearwardly along the opposed faces of the flare sheets 22 and 24 and between the snapping rolls 20 and 21. The arrangement of the gathering chains is shown in detail in the aforementioned U. S. Patent 2,681,541.

The inner flare sheet 22, which is positioned generally above the snapping rolls 20 and 21, has a generally rounded, inclined forward surface or edge 31 extending rearwardly upwardly from the gathering point 25 to the rear upper end of the snapping unit 10. The other flare sheet 24, opposite the snapping rolls 20 and 21, has a rounded forward edge or surface 32 which initially has about the same inclination as the surface 31 of the flare sheet 22. However, the inclination of the surface 32 increases rapidly with increasing distance from the gathering point 26 as indicated in the drawings, the forward edge of the flare sheet being convex in vertical outline and terminating in a portion 34 which is preferably slightly overhanging. The flare sheet 24 is built up so as to extend back generally horizontally from the top of the portion 34, the outer flare sheet in the zone of the rear portion of the snapping rolls (adjacent the plane 5—5 of the drawings along which Figure 5 is taken) being built up much higher than the inner flare sheet 22 in this zone. The purposes and advantages of this construction will be explained hereinafter.

The snapped corn elevator, which is more or less conventional, consists of an endless chain 35 provided with outward projections at intervals for carrying corn from the snapping unit 10 to the husking unit 12. The chain 35 operates within an enclosure consisting of the frame member 16 and a cover 36, the frame member and cover being rearwardly upwardly inclined as indicated in the drawings and the forward, lower end of the chain 35 being positioned below the rear portion of the snapping rolls 20 and 21 as indicated in Figure 5.

The husking unit 12, which in many respects is conventional, does not comprise a portion of the present invention and will not be described in detail. This unit has a transversely extending husking bed, not shown, for removing the husks from the ears delivered by the elevator 11, the husking unit delivering husked ears to the elevator 14 which carries the ears rearwardly upwardly and drops them into a wagon, not shown, trailed behind the tractor in a customary manner.

In the operation of the picker of the present invention, the tractor is driven parallel to the rows of standing corn, the opening between the gathering points 25 and 26 being aligned with a row of corn. As standing stalks of corn enter the forwardly opening slot between the flare sheets 22 and 24, they are engaged by the projections on the gathering chains 27, 29 and 30. The gathering chains are driven at such a speed that the confronting runs of the chains move rearwardly at about the same speed that the tractor moves forward, there being little or no relative motion between these runs of the chains and the ground. The attachment of the stalk to the ground, the spiral ribs on the lower, forward portions of the snapping rolls 20 and 21, and the gathering chains together pull the stalk rearwardly into the slot between the flare sheets and between the snapping rolls. As the stalks are guided into and along between the snapping rolls, the stalks are inclined outwardly away from the tractor due to action of the gathering chains and snapping rolls, the stalks extending generally tangentially from between the snapping rolls and the flare sheets being contoured to permit this.

As the corn picker moves forwardly with the tractor, the stalks move rearwardly between the snapping rolls 20 and 21 and, since the snapping rolls are rearwardly upwardly inclined, the stalks are fed downwardly between the rolls as the rolls are moved forwardly. Snapping of the ears from the stalks occurs in a zone towards the rearward end of the snapping rolls and to the rear of the gathering chains. The ears are snapped from the stalks by the rolls 20 and 21, may or may not be wholly or partially husked by the snapping action, fall upon the lower end of the snapped corn elevator 11, and are carried to the husking unit 12. The stalks pass downwardly between the rolls as the picker moves forwardly and are left standing although often more or less broken.

There is a tendency when corn is excessively dry for ears to be broken off the stalks before reaching the snapping rolls, particularly where the snapping rolls are arranged one above the other and the standing corn is laterally inclined during the snapping operation. In the picker according to the present invention, the outer flare sheet 24 opposite the snapping rolls is built up to a higher elevation than the inner flare sheet in order to intercept and loose ears of tall corn and direct them downwardly onto the elevator rather than permitting them to fall outwardly over the top of the flare sheet and be lost. At the same time, the flare sheet contour of the present invention does not sacrifice down corn that would be lost if the leading edge of the outer flare sheet were brought up more abruptly.

The gathering points 25 and 26 operate in the customary manner to raise down corn sufficiently so that the stalks are conducted rearwardly and into the snapping rolls. Usually, the stalks of down corn, as well as some of the standing corn, will be pulled along the vertically concave forward edge portion of the flare sheet 24 immediately below the portion 34 thereof. It has been found that the built-up portion at the top of the outer flare sheet 24 does not interfere substantially with the harvesting of down corn, and at the same time prevents loss of corn over the top of the flare sheet.

The flare sheet contour of the present invention is equally applicable to two row mounted corn pickers in which a snapping unit is located at each side of the tractor. In that type of picker, the outer flare sheet, which at one side is the right hand flare sheet and at the other side of the tractor is the left hand flare sheet, is given the contour of the present invention. In other words, in a two row mounted picker the outer flare sheet of the left hand snapping unit has the contour of the flare sheet 24 but of opposite hand.

The flare sheet contour of the present invention is likewise applicable to pull-type corn pickers that are supported on their own wheels and towed behind the tractor. In such instance, the flare sheet opposite the snapping rolls is given a contour similar to the contour of flare sheet 24, and the flare sheet above the snapping rolls may be given the contour of the flare sheet 22.

We claim:

1. In a corn picker, a pair of spaced, counter-rotating, juxtapositioned snapping rolls, one roll being positioned at a higher level than the other and the rolls being inclined forwardly and downwardly, a frame for rotatably supporting the snapping rolls, a pair of flare sheets mounted on the frame, and a pair of gathering points mounted on the forward end of the frame, the flare sheets defining the two sides of a generally vertical slot leading rearwardly to the space between the snapping rolls and then an upwardly diverging slot extending upwardly from adjacent said rolls, one flare sheet being positioned on each side of said slot, one of the flare sheets generally overlying the snapping rolls and having a rounded leading edge of generally uniform inclination, and the other flare sheet having a rounded leading edge of rearwardly increasing inclination for supporting and guiding stalks of corn into the snapping rolls and projecting above the level of the first-mentioned flare sheet in the zone of the rear portions of the snapping rolls.

2. In a corn picker, a pair of spaced, counter-rotating, juxtapositioned snapping rolls, one roll being positioned at a higher level than the other and the rolls being inclined forwardly and downwardly, a frame for rotatably supporting the snapping rolls, a pair of flare sheets mounted on the frame, the flare sheets defining the two sides of a generally vertical slot leading rearwardly to the space between the snapping rolls and then an upwardly diverging slot extending upwardly from adjacent said rolls, one flare sheet being positioned on each side of said slot, one of the flare sheets generally overlying the snapping rolls and the other flare sheet having a rounded leading edge of rearwardly increasing inclination for supporting and guiding stalks of corn into the snapping rolls and projecting above the level of the first-mentioned flare sheet in the zone of the rear portions of the snapping rolls.

3. In a corn picker, a pair of spaced, counterrotating, juxtapositioned snapping rolls, one roll being positioned at a higher level than the other and the rolls being inclined forwardly and downwardly, a frame for rotatably supporting the snapping rolls, a pair of flare sheets mounted on the frame, the flare sheets defining the two sides of a generally vertical slot leading rearwardly to the space between the snapping rolls and then an upwardly diverging slot extending upwardly from adjacent said rolls, one flare sheet being positioned on each side of said slot, one of the flare sheets generally overlying the snapping rolls and the other flare sheet having a rounded inclined leading edge of rearwardly increasing inclination terminating at its upper end in a substantially vertical section in advance of the zone of the rear portions of the snapping rolls.

References Cited in the file of this patent

UNITED STATES PATENTS

| | | |
|---|---|---|
| 1,160,777 | Small | Nov. 16, 1915 |
| 2,121,859 | Currie et al. | June 28, 1938 |
| 2,681,541 | Richey et al. | June 22, 1954 |
| 2,751,744 | Reade et al. | June 26, 1956 |